United States Patent
Norheim et al.

(10) Patent No.: US 11,570,220 B1
(45) Date of Patent: Jan. 31, 2023

(54) DEVICE-BASED AD HOC CONFERENCING

(71) Applicant: Cisco Technology, Inc., San Jose, CA (US)

(72) Inventors: Vigleik Norheim, Ranheim (NO); Terje Olsen, Trondheim (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 74 days.

(21) Appl. No.: 16/992,556

(22) Filed: Aug. 13, 2020

(51) Int. Cl.
*G06F 15/16* (2006.01)
*H04L 65/403* (2022.01)
*H04L 65/1069* (2022.01)
*H04L 67/02* (2022.01)

(52) U.S. Cl.
CPC ........ *H04L 65/403* (2013.01); *H04L 65/1069* (2013.01); *H04L 67/02* (2013.01)

(58) Field of Classification Search
CPC ... H04L 65/403; H04L 65/1069; H04L 67/02; H04L 65/406
See application file for complete search history.

(56) References Cited

U.S. PATENT DOCUMENTS

| | | | |
|---|---|---|---|
| 8,248,450 B2 | 8/2012 | Cho | |
| 9,369,673 B2 | 6/2016 | Ma et al. | |
| 9,819,905 B1 | 11/2017 | Breitbard et al. | |
| 10,616,278 B1* | 4/2020 | Johansson | H04L 65/1069 |
| 2008/0256182 A1* | 10/2008 | Sekaran | H04L 12/1822 |
| | | | 709/204 |
| 2011/0271212 A1* | 11/2011 | Jones | H04L 12/1818 |
| | | | 715/753 |
| 2012/0246229 A1* | 9/2012 | Carr | H04L 12/1818 |
| | | | 709/204 |
| 2014/0112211 A1* | 4/2014 | Walters | H04M 3/567 |
| | | | 370/261 |
| 2014/0136630 A1* | 5/2014 | Siegel | G06Q 10/109 |
| | | | 709/206 |
| 2014/0317532 A1* | 10/2014 | Ma | H04N 7/152 |
| | | | 715/753 |
| 2015/0163069 A1* | 6/2015 | Karniely | H04L 12/1822 |
| | | | 709/205 |

(Continued)

OTHER PUBLICATIONS

Baine, Lindsey et al., "Introducing Meeting Connect", https://www.pexip.com/blog1.0/introducing-meetingconnect, downloaded Aug. 13, 2020, 4 pages.

(Continued)

*Primary Examiner* — Farzana B Huq

(74) *Attorney, Agent, or Firm* — Edell, Shapiro & Finnan, LLC

(57) ABSTRACT

An ad hoc conferencing system and methods are provided. Information is stored to associate a particular meeting link with an endpoint device. A first request to initiate a communication session is received from the endpoint device, wherein the first request is generated by a local participant interacting with the endpoint device. A second request to join the communication session is received from a remote device, wherein the second request is transmitted in response to a remote participant inputting, on the remote device, the particular meeting link. The communication session is established between the endpoint device and the remote device based on receiving the first request and receiving the second request.

20 Claims, 6 Drawing Sheets

(56) References Cited

U.S. PATENT DOCUMENTS

| | | | | |
|---|---|---|---|---|
| 2015/0350258 A1* | 12/2015 | Griffin | | H04N 7/15 |
| | | | | 348/14.08 |
| 2016/0112472 A1* | 4/2016 | Pugalia | | H04L 67/02 |
| | | | | 709/204 |
| 2016/0191580 A1* | 6/2016 | Goepp | | H04L 47/70 |
| | | | | 370/260 |
| 2018/0098030 A1* | 4/2018 | Morabia | | H04L 65/1089 |
| 2018/0184047 A1* | 6/2018 | Simonsen | | H04L 65/4038 |
| 2018/0352303 A1* | 12/2018 | Siddique | | H04M 3/567 |
| 2019/0281096 A1* | 9/2019 | Mazzarella | | H04L 65/1069 |
| 2019/0306101 A1* | 10/2019 | Synal | | H04L 65/1063 |

OTHER PUBLICATIONS

Zoom Video Communications, Inc , "Zoom Rooms", User Guide, https://assets zoom.us/docs/user-guides/zoom-rooms-full-user-guide. pdf, Feb. 2018, 6 pages.

Zoom Video Communications, Inc., "Meet Now vs Scheduled Meetings", https://support.zoom.us/hc/en-us/articles/201362533-Meet-Now-vs-Scheduled-Meetings, downloaded Aug. 13, 2020, 3 pages.

W3C WebRTC Working Group, "WebRTC 1.0: Real-time Communication Between Browsers", https://www.w3.org/TR/webrtc/, Dec. 13, 2019, 143 pages.

* cited by examiner

DEVICE-BASED AD HOC CONFERENCING

TECHNICAL FIELD

The present disclosure relates to conferencing, and more specifically, to device-based ad hoc conferencing.

BACKGROUND

Video conferencing solutions enable remote participants to exchange audio and video communication in real-time. Joining a virtual meeting by video can be a complicated process however; for example, a host must typically know participants' email addresses or other contact information so that the host can send invitations, or participants must register a device or otherwise authenticate with a conferencing service.

BRIEF DESCRIPTION OF THE DRAWINGS

Generally, like reference numerals in the various figures are utilized to designate like components.

DESCRIPTION OF EXAMPLE EMBODIMENTS

Overview

Figure 1:
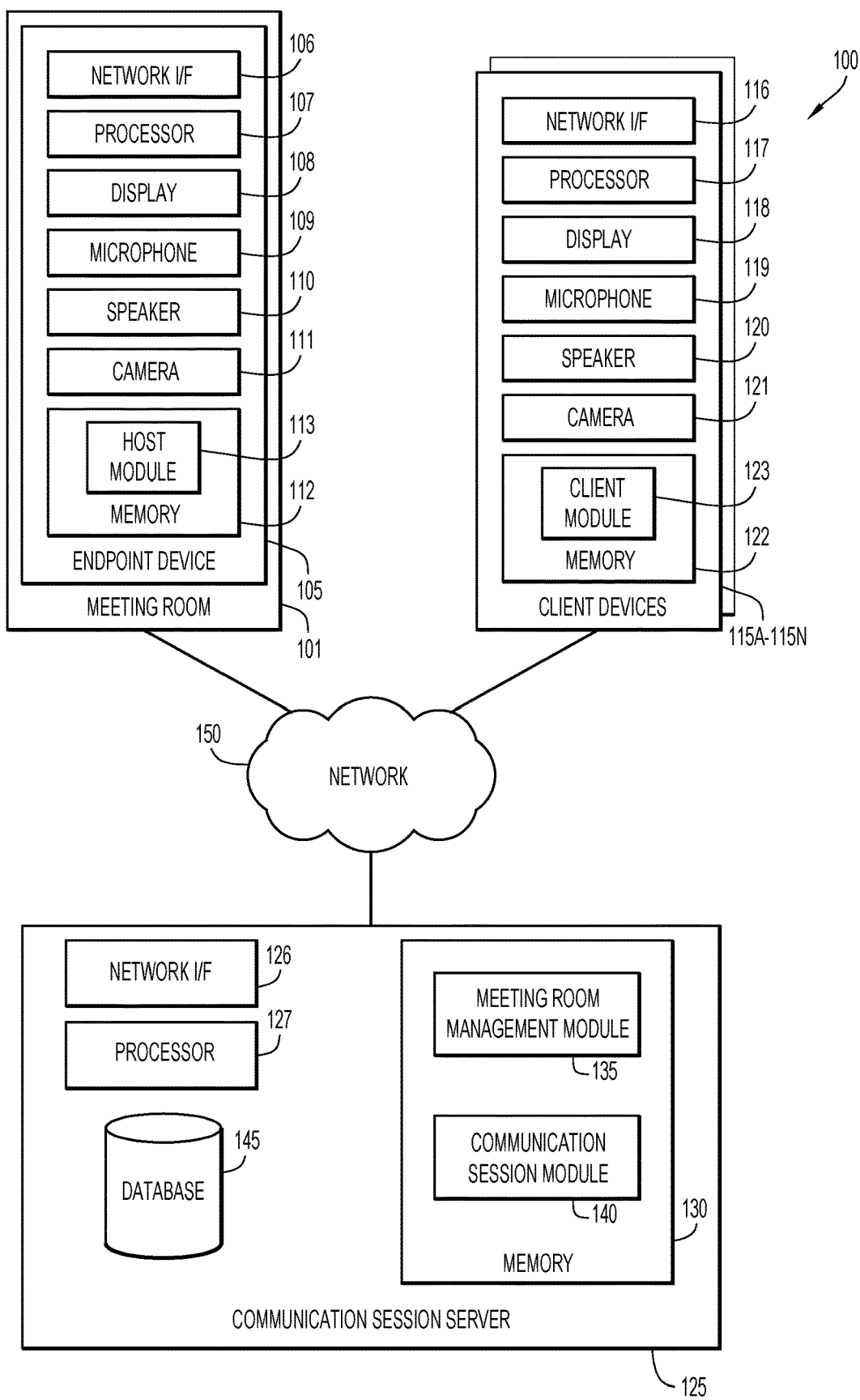
FIG. 1 is a block diagram depicting a system for device-based conferencing in accordance with an example embodiment.

According to one embodiment, methods are provided for device-based ad hoc conferencing. Information is stored at a server to associate a particular meeting link with a video conference endpoint device. The server receives a first request to initiate a communication session from the endpoint device, wherein the first request is generated by a local participant interacting with the endpoint device. The server receives a second request to join the communication session is server from a remote device, wherein the second request is transmitted in response to a remote participant inputting, on the remote device, the particular meeting link. The server establishes the communication session between the endpoint device and the remote device based on receiving the first request and receiving the second request.

EXAMPLE EMBODIMENTS

Embodiments are provided for conferencing, and more specifically, to device-based ad hoc conferencing, such as video calls or conferencing between two or more participants, where one participant initiates the call or conference from a video conference endpoint.

Initiating a video conference or call using a video endpoint can be complex. The user interface on a video conference endpoint can be intimidating to a novice user. If the user is not a trained on the use of the video conference endpoint or is not enrolled in a directory that allows for automatic scheduling of the video endpoint and meeting resources, it is difficult to initiate an ad hoc video call or conference. Moreover, there is a trend of sharing meeting rooms, where a video endpoint is often deployed, between different business or enterprises in the same building. Consequently, there is need for zero-threshold (ad hoc) calling where a user can initiate a video call with anyone, on any device, quickly, from a meeting room where the video endpoint resides.

Accordingly, embodiments are presented herein that enable communication sessions (audio, audio/video) to be initiated from a video endpoint on an ad hoc basis in a manner that greatly reduces the amount of user input and a priori knowledge about the use of the video endpoint to initiate or join a virtual meeting. In particular, a virtual meeting room is dedicated to an endpoint device in a physical meeting space using a memorable meeting link. A host can initiate a virtual meeting by interacting with the endpoint device, and one or more remote participants can join the virtual meeting by simply entering the meeting link into their own user devices. A naming scheme for meeting links can ensure that the names of virtual meeting rooms are easily-remembered and related to, or descriptive of, the physical meeting space itself where the video endpoint is located. The participants' knowledge of the meeting link may serve to authenticate a remote user as a participant of the virtual meeting.

Thus, present embodiments enable ad hoc communication sessions in which virtual meetings involving a video endpoint can be initiated or joined using a single input by a user, without requiring any extraneous effort on the part of users, such as distributing meeting identification (ID) codes and/or passcodes, training on the video endpoint equipment, user registration with a conference service, installation of software, and the like. By providing device-based ad hoc conferencing in accordance with the embodiments presented herein, meetings can be initiated and/or joined much more quickly and easily.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now be described in detail with reference to the Figures. FIG. 1 is a block diagram depicting a video conference system (or "system") 100 for device-based conferencing in accordance with an example embodiment. As depicted, system 100 includes a meeting room 101 in which an endpoint device 105 resides or is installed, one or more remote client or user devices 115A-115N, a communication session server 125, and a network 150. It is to be understood that the functional division among components of system 100 have been chosen for purposes of explaining various embodiments and is not to be construed as a limiting example.

Meeting room 101 may include any physical space that one or more individuals can occupy in order to conduct a meeting. Meeting room 101 can be an indoor area, an outdoor area, or a partially indoor/outdoor area. For example, meeting room 101 may be a particular room in an office building. Generally, meeting room 101 may include any area in which one or more video endpoint devices (e.g., endpoint device 105) can be located such that an endpoint device can capture video and/or audio data of an individual in meeting room 101 in order to support a communication session between the local individual and one or more other remote participants.

Endpoint device 105 includes a network interface (I/F) 106, at least one processor 107, at least one display 108, at least one microphone 109, a speaker 110, a camera 111, and memory 112 that stores software for various functional modules, including software for a host module 113. Endpoint device 105 may be a video conferencing device that can take a variety of forms and complexities. For example, the endpoint device 105 may be a simple single screen video conference endpoint with a touch-screen user interface, or a multiple screen video conference endpoint that has a touch-screen user interface pad used to control operation of the endpoint device 105. Network interface 106 may include one or more network interface cards, for example, to the endpoint device 105 to send and receive data over a network, such as over network 150. In general, a user of endpoint device 105 may initiate and/or conduct communication sessions with one or more remote participants. Endpoint device 105 may include internal and external hardware components, as depicted and described in further detail with respect to FIG. 6.

Display 108 may include any electronic visual display or screen capable of presenting information in a visual form. For example, display 108 may be a liquid crystal display (LCD), a light-emitting diode (LED) display, an electronic ink display, a touchscreen, and the like. Display 108 may present a graphical user interface that includes interface elements for the display of information related to initiating and/or conducting a communication session. During a communication session, still and/or video image data of one or more remote participants may be presented to local participants (i.e., individuals in meeting room 101) via display 108. As mentioned above, the endpoint device 105 may include more than one display 108.

Microphone 109 may include any transducer capable of converting sound to an electrical signal, and speaker 110 may include any transducer capable of converting an electrical signal to sound. Together, microphone 109 and speaker 110 can support bidirectional audio communication between a local participant (i.e. a participant local to endpoint device 105) and a remote participant. The endpoint device 105 may include multiple microphones 109 and multiple speakers 110.

Camera 111 may include any conventional or other image capture device capable of still and/or video data. Together, camera 111 and display 108 can support bidirectional video communication between a local participant (i.e. a participant local to endpoint device 105) and a remote participant. The endpoint device 105 may include multiple cameras.

In some embodiments, endpoint device 105 may be configured such that one or more of each component, including display 108, microphone 109, speaker 110, and/or camera 111, are positioned in various locations within meeting room 101. In particular, one or more displays 108, microphones 109, speakers 110, and/or cameras 111 may be positioned in locations conducive to the capture of local video and/or audio data of multiple local participants, or the output of video and/or audio data captured from remote participants' client devices. For example, if meeting room 101 contains a boardroom table, multiple microphones 109 and speakers 110 may be provided along the length of the table.

Host module 113 may include one or more modules or units to perform various functions of present embodiments described below. Host module 113 may be implemented by any combination of any quantity of software and/or hardware modules or units, and may reside within memory 112 of endpoint device 105 for execution by a processor, such as processor 107.

Host module 113 enables a user of endpoint device 105 to initiate and conduct a communication session. Host module 113 may detect when a user interacts with endpoint device 105 to initiate a communication session. A user can initiate a communication session by actuating a hardware button or by providing input to an interface element presented on display 108 of endpoint device 105. In some embodiments, host module 113 causes text and graphics-based instructions to be displayed (e.g. via display 108) that explain how to initiate a communication session. The displayed instructions can include a meeting link that is associated with endpoint device and that, when executed by a client device, such as any of client devices 115A-115N, enables the client device to join the communication session initiated by endpoint device 105.

Host module 113 may cause the endpoint device 105 to transmit a notification to a server, such as communication session server 125, in response to a local user providing input to initiate a communication session. Thus, the server 125 can establish a communication session between endpoint device 105 and one or more remote devices, such as one or more client device 115A-115N. In some embodiments, host module 113 may form a peer-to-peer connection with remote devices in order to initiate and/or conduct a communication session.

Additionally or alternatively, host module 113 enables a user of endpoint device 105 to approve or deny requests by remote participants to join a communication session, and/or to close off ("lock") a communication session such that any further requests to join are denied or otherwise blocked. In some embodiments, when a user of a client device, such as any of client devices 115A-115N, attempts to join a communication session by inputting the meeting link into the client device, the user is placed in a temporary virtual waiting room; endpoint device 105 is notified of the user's request to join the meeting, and a host can either approve or deny the user access to the communication session. Similarly, a host can provide input to endpoint device 105 in order to prevent any subsequent devices from joining a communication session.

Client devices 115A-115N each include a network interface (I/F) 116, at least one processor 117, a display 118, a microphone 119, a speaker 120, a camera 121, and memory 122 that includes a client module 123. Each client device 115A-115N may include a laptop computer, a tablet computer, a netbook computer, a personal computer (PC), a desktop computer, a personal digital assistant (PDA), a smart phone, a video conferencing endpoint device, or any other programmable electronic device capable of executing computer readable program instructions. Network interface 116 enables the client device 115A-115N to send and receive data over a network, such as network 150. In general, a user of any client device of client devices 115A-115N may initiate and/or conduct communication sessions with other participants, such as a user of another client device and/or a participant local to endpoint device 105. Each client device 115A-115N may include internal and external hardware components, as depicted and described in further detail with respect to FIG. 6.

Display 118 may include any electronic visual display or screen capable of presenting information in a visual form. For example, display 118 may be a LCD, LED display, an electronic ink display, a touchscreen, and the like. Display 118 may present a graphical user interface that includes interface elements for the display of information related to initiating and/or conducting a communication session. During a communication session, still and/or video image data of one or more communication session participants may be presented to a user of any client device 115A-115N via display 118.

Microphone 119 may include any transducer capable of converting sound to an electrical signal, and speaker 120 may include any transducer capable of converting an electrical signal to sound. Together, microphone 119 and speaker 120 can support bidirectional audio communication between a local user (i.e. a communication session participant local to any of client devices 115A-115N) and a remote participant (e.g., a user local to endpoint device 105 or another client device).

Camera 121 may include any conventional or other image capture device capable of still and/or video data. Together, camera 121 and display 118 can support bidirectional video communication between a local participant (i.e. a participant local to endpoint device 105) and a remote participant.

Client module 123 may include one or more modules or units to perform various functions of the embodiments described below. Client module 123 may be implemented by any combination of any quantity of software and/or hardware modules or units, and may reside within memory 122 of any of client devices 115A-115N for execution by a processor, such as processor 117.

Client module 123 enables a user of any of client devices 115A-115N to join, request to join, and/or participate in a communication session. When a user inputs a meeting link, client module 123 may join a communication session initiated by the device that is associated with the link (e.g., endpoint device 105). In some embodiments, when a user provides a meeting link to client module 123, client module 123 may forward the meeting link to communication session server 125 to request to join a communication session of the endpoint device specified by the link.

When client module 123 joins a communication session, client module 123 enables a user of the client device to communicate via video and/or audio in real-time with other meeting participants. Client module 123 may exchange video and/or audio data with one or more client modules 123 of other client devices 115A-115N and/or with host module 113 of endpoint device 105. In various embodiments, client module 123 can transmit video and/or audio data directly to another device (e.g., by establishing a peer-to-peer connection), or communication session server 125 may facilitate the exchange of video and/or audio data between participants of a communication session.

In some embodiments, client module 123 is a web browser. Client module 123 may transmit and receive audio and/or video data according to any conventional or other protocol. Client module 123 may include one or more application programming interfaces (APIs) to support the exchange of data during a communication session. In some embodiments, client module 123 utilizes a protocol, such as a Web Real-Time Communication (WebRTC) protocol, so that no additional plug-ins, libraries, or executables are required to be acquired and installed from external sources.

Communication session server 125 includes a network interface (I/F) 126, at least one processor 127, memory 130, and database 145. Memory 130 stores software instructions for a meeting room management module 135 and a communication session module 140. Communication session server 125 may include a rack-mounted server, or any other programmable electronic device capable of executing computer readable program instructions. Network interface 126 enables components of communication session server 125 to send and receive data over a network, such as network 150. In general, communication session server 125 enables user devices, such as endpoint device 105 and client devices 115A-115N, to establish and conduct a communication session. Communication session server 125 may include internal and external hardware components, as depicted and described in further detail with respect to FIG. 6.

Meeting room management module 135 and communication session module 140 may include one or more modules or units to perform various functions of the embodiments described below. Meeting room management module 135 and communication session module 140 may be implemented by any combination of any quantity of software and/or hardware modules or units, and may reside within memory 130 of communication session server 125 for execution by a processor, such as processor 127.

Meeting room management module 135 maintains and updates database 145 in which relationships between meeting links, endpoint devices, and/or meeting rooms are stored. An endpoint can be associated with a static meeting link so that remote participants in a communication session can join a meeting that is initiated by the endpoint using the endpoint's meeting link. Furthermore, meeting room management module 135 may associate a name of a meeting room with the endpoint and/or meeting link.

Meeting links may be selected, defined, or otherwise assigned according to any predetermined or other naming scheme. A meeting link may be in the form of a uniform resource identifier (URI), such as a uniform resource locator (URL). A meeting link can be expressed as a hyperlink that can be activated by a user of a computing device, such as any of client devices 115A-115N. In some embodiments, a meeting link includes a portion that identifies or relates to an organization associated with the endpoint device and/or meeting room, and another portion that identifies the endpoint device and/or meeting room itself. For example, a meeting link for an endpoint device in a library of an office of Acme Corporation might be "library.acme.com", www.acme.com/library, and the like. In some embodiments, multiple endpoint devices in a same meeting room may share a same meeting link, and remote participants who join a communication session using the meeting link may establish a connection between their client device (e.g., any of client devices 115A-115N) and a particular endpoint device in the meeting room that is activated by a host (e.g., endpoint device 105). Meeting links can be defined using a memorable naming convention such that users will be more apt to remember a meeting link for a future meeting; thus, a host may only have to inform a participant of a meeting link once in order to conduct subsequent communication sessions. Meeting links can be defined according to a memorable naming scheme that associates endpoint devices with the name of the room or area in which each endpoint device is installed. For example, an organization may have a first endpoint device in a main conference room whose communication sessions are accessible via a "mainconference.acme.com" meeting link, a second endpoint device in a board room whose communication sessions are accessible via a "boardroom.acme.com" meeting link, and the like.

Communication session module 140 enables communication session server 125 to facilitate communication sessions between devices, including the initiation of communication sessions and exchange of video and/or audio. In particular, communication session module 140 may act as an intermediary through which endpoint device 105 and one or more client devices 115A-115N exchange video and/or audio. In some embodiments, communication session module 140 acts as an intermediary through which participants' devices exchange data for some or all of a communication session; in other embodiments, communication session module 140 facilitates the initiation of peer-to-peer connections between the computing devices of participants, which may subsequently exchange audio and/or video such that the data is not transmitted through communication session server 125. In some embodiments, communication session module 140 tracks which endpoint devices are currently in use (e.g., engaged in a communication session) so that a user may locate an available endpoint device.

In some embodiments, when a host initiates a communication session at endpoint device 105, communication session module 140 receives a notification from endpoint device 105 indicating that the host has initiated a communication session. In response, communication session module 140 may provision or otherwise allocate computing and/or network resources for a virtual meeting room that supports the exchange of video and/or audio data between participants of the communication session. In some embodiments, computing and/or network resources for a communication session may be pre-allocated on an endpoint basis; for example, computing and/or network resources may be reserved or otherwise dedicated for use by each endpoint registered with meeting room management module 135.

When a remote participant activates a meeting link via client module 123, a request may be received by communication session module 140 indicating that the client device of the remote participant is requesting to join a communication session with the endpoint device 105 associated with the meeting link. In some embodiments, when a remote participant activates a meeting link, client module 123 directly transmits a request to communication session module 140. In other embodiments, when a remote participant activates a meeting link, client module 123 navigates to a server associated with the meeting link, which then transmits the request to join the communication session to communication session module 140 and/or redirects client module 123 to communication session server 125. For example, when a user of any of client devices 115A-115N activates the meeting link "mainconference.acme.com," client module 123 may first navigate to a network address associated with the domain (e.g., "acme.com"), where the request to join a communication session is received by a server that is configured to forward the request to communication session server 125, thus enabling communication session module 140 to add the requesting client device to a communication session (e.g., the communication session initiated by the endpoint device that is associated with the meeting link "mainconference.acme.com").

Database 145 may include any non-volatile storage media known in the art. For example, database 145 can be implemented with a tape library, optical library, one or more independent hard disk drives, or multiple hard disk drives in a redundant array of independent disks (RAID). Similarly, data in database 145 may conform to any suitable storage architecture known in the art, such as a file, a relational database, an object-oriented database, and/or one or more tables. Database 145 may store data indicating the relationships between meeting links, endpoint devices, and/or meeting rooms. For example, each entry in database 145 may include a meeting link, an identity of an endpoint device, and optionally, a name of a meeting room in which the endpoint device is situated. Endpoint devices can be identified using any identifier, such as a network address (e.g., Internet Protocol (IP) address), a media access control (MAC) address, a universally unique identifier (UUID), or any other identifier or combination thereof.

Network 150 may include a local area network (LAN), a wide area network (WAN) such as the Internet, or a combination of the two, and includes wired, wireless, or fiber optic connections. In general, network 150 can be any combination of connections and protocols known in the art that will support communications between endpoint device 105, client devices 115A-115N, and/or communication session server 125 via their respective network interfaces in accordance with the described embodiments.

Figure 2:
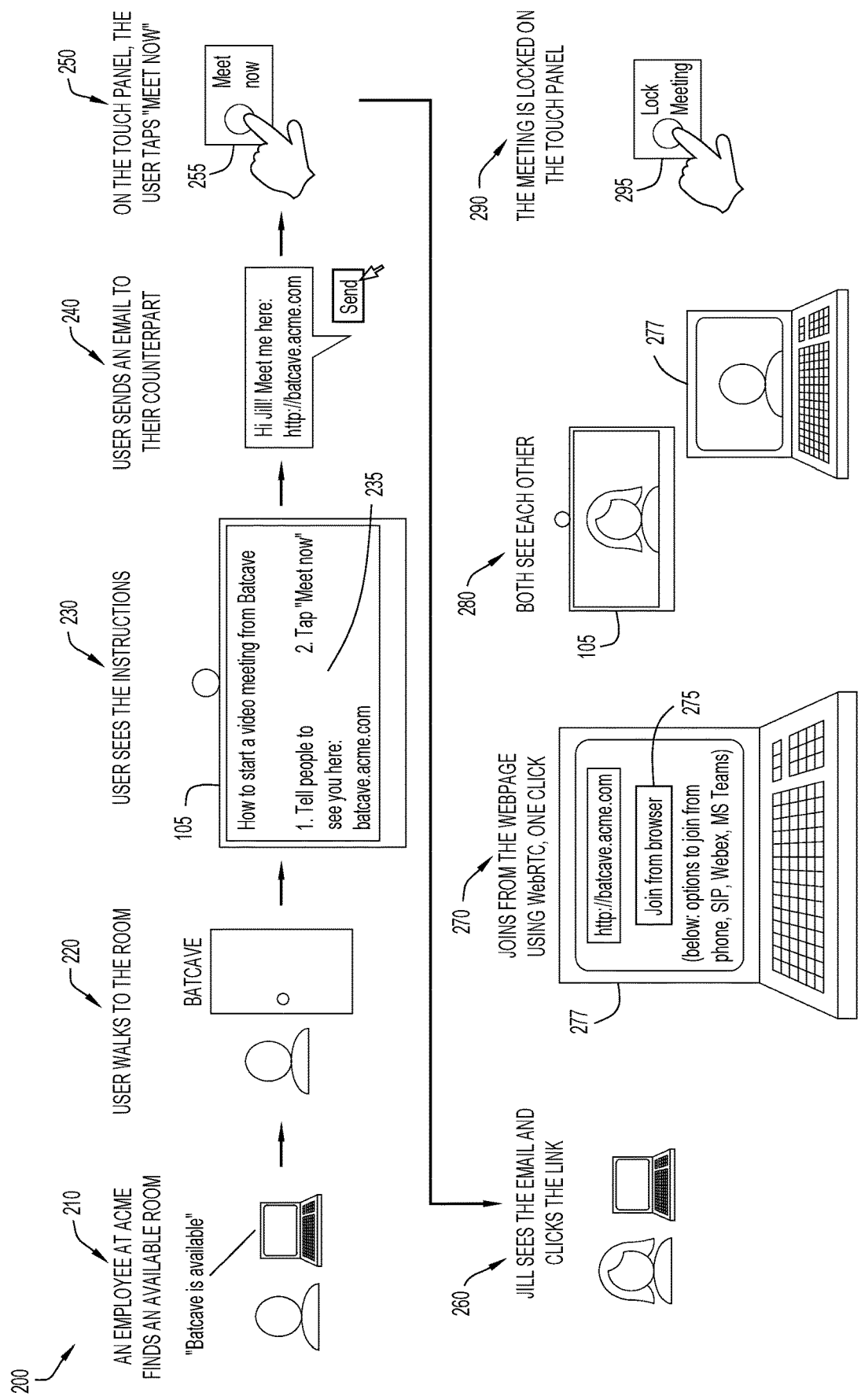
FIG. 2 is a functional flow diagram depicting the initiation of a communication session in accordance with an example embodiment.

FIG. 2 is a functional flow diagram 200 depicting the initiation of a communication session in accordance with various embodiments.

At operation 210, a person who is to serve as a host for a meeting finds an available room for hosting a communication session. At operation 220, the host enters the selected room or other area in which an available endpoint device is located. The host can initiate a communication session by interacting with the endpoint device and/or any peripheral input devices associated with the endpoint device, as described further below. Multiple people in the meeting room may be part of the communication session initiated from the meeting room.

At operation 230, an endpoint device (such as endpoint device 105) in the room displays instructions for initiating a communication session to the host. For example, the endpoint device may present a meeting link that has been associated with the endpoint device, and any other text or graphics-based instructions 235 regarding how to initiate a communication session (e.g., which hardware button or user interface element to activate, etc.). In this example, the instructions 235 indicate that the meeting room is called "Batcave" and the meeting link "batcave.acme.com" is displayed as the meeting link to be shared with other remote meeting participants. Furthermore, the instructions 235 indicate to tap the "Meet Now" button to initiate a communication session from the endpoint device 105.

At operation 240, the host provides one or more remote participants with the meeting link. The host can inform any desired participant through any communication medium. For example, the host can share the meeting link verbally, through a messaging service such as Short Messaging Service (SMS), through e-mail, and the like. Since meeting links may be selected in order to be memorable, participants can remember the meeting link for use in any future virtual meetings that are initiated at the same endpoint. In the depicted example, the name or nickname of the meeting room is "Batcave," and thus the meeting link, "batcave.acme.com," has been selected in order to be particularly memorable for remote participants.

At operation 250, the host requests a communication session to be initiated. The host can activate a hardware button or user interface element 255 in order to cause the endpoint device to transmit a request to initiate a communication session to communication session server 125, which, in response, may receive requests to join the communication session from the client devices of remote participants.

At operation 260, a remote participant activates the meeting link. The remote participant can input the meeting link, provided by the host or previously known to the participant, into the client device of the remote participant. When the meeting link is activated, the remote participant's client device may retrieve instructions from a network-accessible location that can be accessed via the meeting link.

At operation 270, the remote participant is presented with instructions to join the communication session. For example, the instructions may include a hardware button or user interface element 275 of the client device 277 to activate in order to join the communication session. Additionally, options can be presented to a user of the client device, such as a selection of how to obtain video and/or audio data for the communication session, the protocol with which to exchange video and/or audio data during the communication session, which software application(s) to use to present the communication session to the user, and the like.

At operation 280, a communication session is established between the host at the endpoint device 105 and the remote participant so that video and/or audio may be exchanged. When the remote participant provides input to join the communication session, the client device 277 joins the communication session and video and/or audio can be shared between the client device, the endpoint device, and any other client devices. Thus, remote participants' knowledge of the meeting link serves to authenticate the remote participant's client device to join the communication session.

At operation 290, the host may lock the communication session to prevent further individuals from joining the communication session. For example, the a "lock" user interface button 295 may be presented on the display of the endpoint device 105 to enable the host to prevent other participants who have knowledge of the meeting link associated with the endpoint device 105 from joining the virtual meeting. Once the invited meeting participants have joined the communication session, the host can close off the communication session from further participants by selecting the lock button 295. Alternatively, a host can prevent further users from joining a communication session at the host's discretion.

Figure 3:
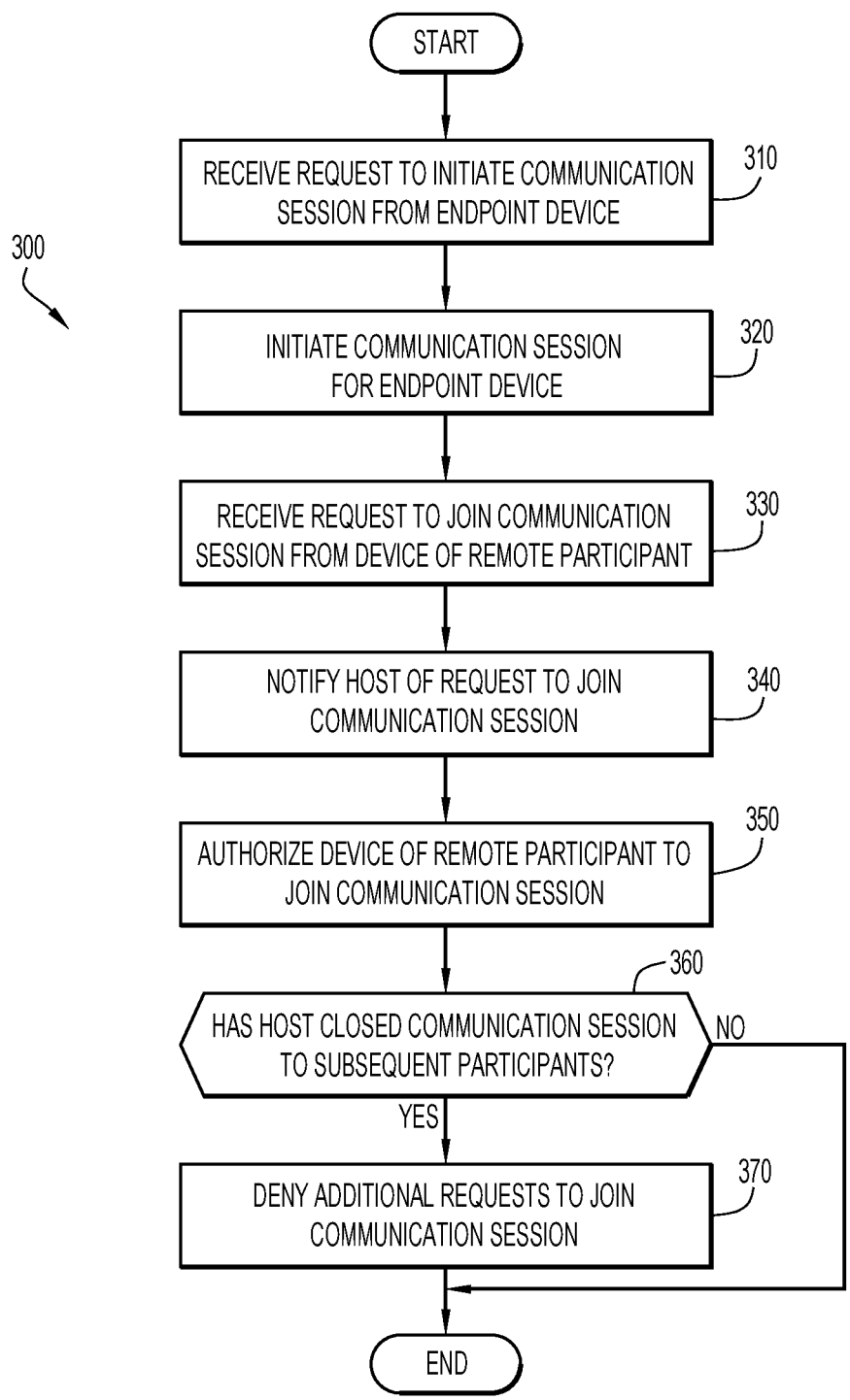
FIG. 3 is a flow chart depicting a method performed by a server for establishing a communication session in accordance with an example embodiment.

FIG. 3 is a flow chart depicting a method 300 performed by a server, e.g., conference session server 125 shown in FIG. 1, for establishing a communication session in accordance with example embodiments. Reference is also made to FIGS. 1 and 2 for purposes of the description of the flow chart of FIG. 3.

A request to initiate a communication session is received from an endpoint device at operation 310. A server, such as communication session server 125, receives the request to initiate a communication session in response to a host of the communication session providing input at the endpoint device to request initiation of the communication session. The request may indicate the identity of the endpoint device and/or an identity of the meeting room or other physical space in which the endpoint device is located.

A communication session is initiated for the endpoint device at operation 320. Communication session server 125 may initiate a communication session via communication session module 140. Initially, the endpoint device is included in the communication session, and other participants may join the communication session upon request and/or approval. Devices in a communication session may exchange video and/or audio captured at the devices, enabling participants to conduct a virtual meeting in which the participants communicate with each other.

A request to join the communication session is received from a client device of a remote participant at operation 330. A request to join the communication session may be received by communication session server 125 from a client device of a remote participant, such as any of client devices 115A-115N.

The host of the communication session is notified of the request to join the communication session at operation 340. The request to join the communication session can be forwarded from communication session server 125 to the endpoint device that initiated the communication session (e.g., endpoint device 105) so that the host (e.g., the user of endpoint device 105) can approve or deny the remote participant's request to join the communication session.

The client device of the remote participant is authorized to join the communication session at operation 350. When communication session server 125 receives an authorization from endpoint device 105 to admit the requesting client device of the remote participant to the communication session, the client device is permitted to join and can begin to exchange video and/or audio between endpoint device 105 and any other authorized client devices 115A-115N.

Operation 360 determines whether the host has closed ("locked") the communication session to subsequent participants. When communication session server 125 receives an indication (command) to close the communication session from endpoint device 105, communication session server 125 denies any subsequently-received requests to join the communication session at operation 370. In some embodiments, communication session server 125 transmits a response to a blocked device to indicate that the host has closed the communication session. In some embodiments, the communication session is closed automatically in response to all invited users and/or a predetermined number of users joining the communication session.

Figure 4:
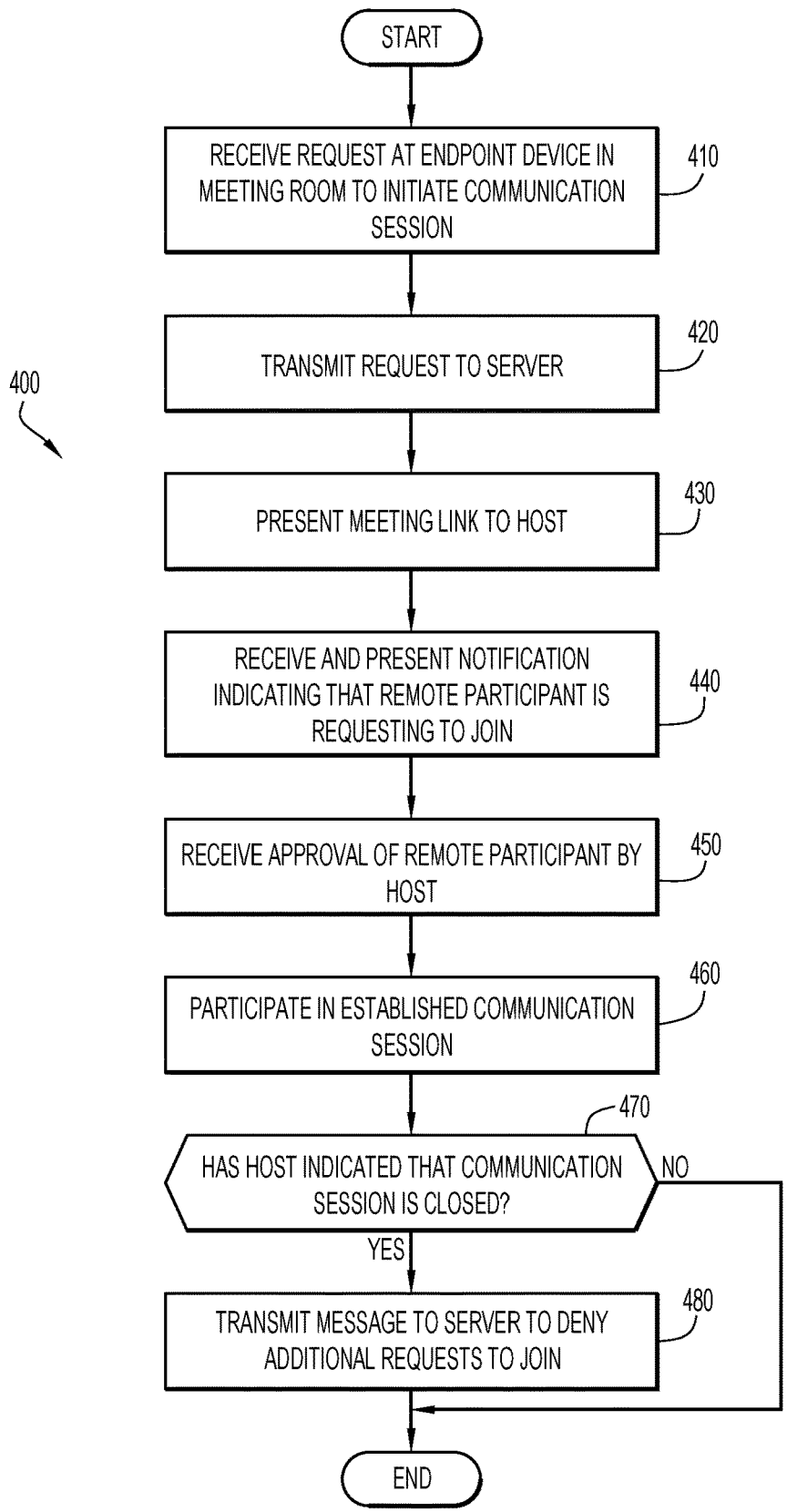
FIG. 4 is a flow chart depicting a method performed by an video conference endpoint device for establishing a communication session in accordance with an example embodiment.

FIG. 4 is a flow chart depicting a method 400 performed by a video endpoint device for establishing a communication session in accordance with an example embodiment. Reference is also made to FIGS. 1 and 2 for purposes of the description of the flow chart of FIG. 4.

A request to initiate a communication session is received at an endpoint device in a meeting room at operation 410. The endpoint device may include any electronic device that can capture and present audio and/or video, such as endpoint device 105. The endpoint device can be located in any physical space; while a meeting room is used as an example, it should be understood that the endpoint device can be located in any indoor, outdoor, or combined indoor/outdoor area. The request to initiate a communication session can be received by the endpoint device in response to the host (e.g., a local user) providing input via, e.g., a hardware button, user interface element, etc.

The request to initiate the communication session is transmitted to a server at operation 420. The endpoint device transmits the request to a server, such as communication session server 125 shown in FIG. 1, and in response to receiving the request, the server initiates a communication session and monitors for incoming requests to join the communication session from devices of remote participants.

The meeting link is presented to the host at operation 430. The endpoint device may display a meeting link that is uniquely associated with the endpoint device and enables remote participants to join communication sessions initiated by that specific endpoint device. The host may share the meeting link with remote participants so that the remote participants can request to join the communication session, and/or remote participants can join using their prior knowledge of the meeting link. It should be understood that operation 430 may occur prior to operation 410 insofar as the meeting link uniquely associated with the endpoint device may continuously be displayed on the endpoint device, or displayed in a default screen on the endpoint device so that any user can readily see the meeting link and thus be able to share it with others.

A notification indicating that a remote participant is requesting to join the communication session is received and presented to the host at operation 440. When a remote participant activates the meeting link on their client device, communication session server 125 receives the remote participant's request to join the communication session and accordingly transmits a notification of the request to endpoint device 105. A host of the communication session may manually approve or deny each request. In some embodiments, a client device that requests to join a communication session is automatically added to the communication session by communication session server 125. Approval of the remote participant by the host is received at operation 450. Endpoint device 105 receives approval based on input by the host.

The endpoint device participates in a communication session with the approved client device of the remote participant at operation 460. Endpoint device 105 exchanges audio and/or video with any of client devices that have been approved to join the communication session.

Operation 470 determines whether the host has indicated that the communication session is closed. If a host provides input to endpoint device 105 to close ("lock") the communication session, a message is transmitted to the server to deny additional requests to join the communication session at operation 480.

Figure 5:
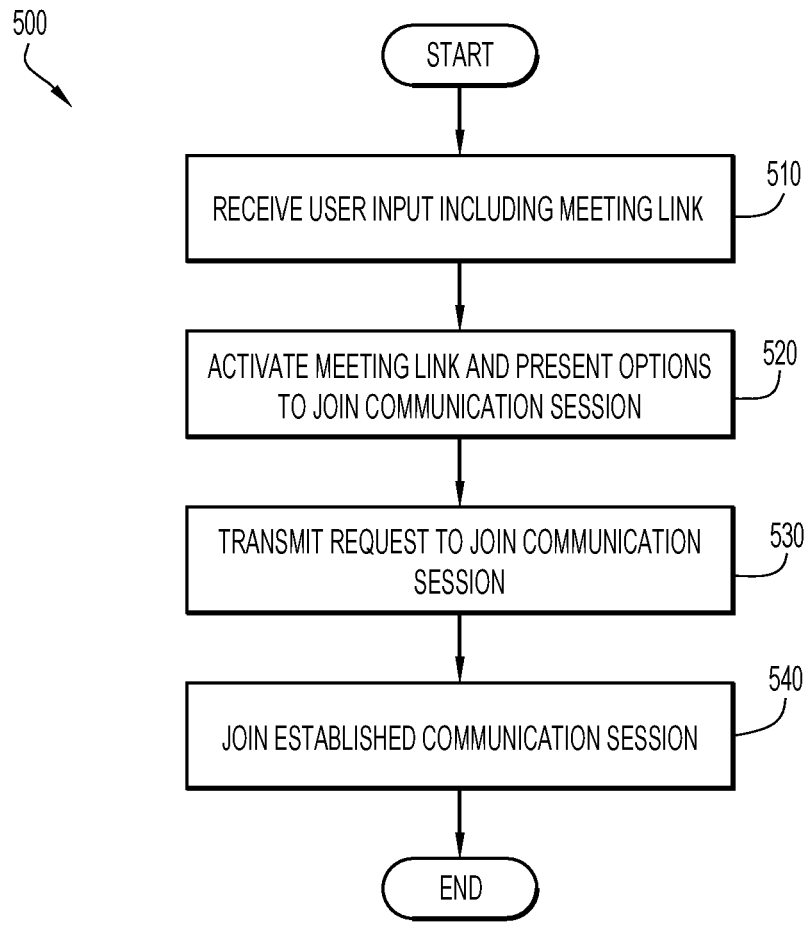
FIG. 5 is a flow chart depicting a method performing at a remote participant device for joining a communication session in accordance with an example embodiment.

FIG. 5 is a flow chart depicting a method 500 performed at a remote client device for joining a communication session in accordance with an example embodiment. Reference is also made to FIGS. 1 and 2 for purposes of the description of the flow chart of FIG. 5.

User input including a meeting link is received at operation 510. The user of a client device, such as any of client devices 115A-115N, can provide input including a meeting link that is specific to a particular endpoint device of a host of a communication session. The user, who may be remote from the endpoint device, may be provided with the meeting link by the host or another user, or the user may have prior knowledge of the meeting link for the endpoint device.

The client device activates the meeting link and presents to the user options for joining the communication session at operation 520. When the meeting link is executed, the client device may obtain instructions from a network-accessible location for joining the communication session. Furthermore, the client device may present a user interface element that, when activated by the user, causes the client device to transmit a request to join the communication session. Options for joining the communication session may also be presented to a user. The options can include any video and/or audio settings, such as devices to use to capture local images and/or audio, options regarding which protocols to use, options regarding which software to use during the communication session, and the like.

A request to join the communication session is transmitted at operation 530. In some embodiments, the request to join the communication session is transmitted in response to a user indicating, at the client device, that the user desires to join the communication session. In some embodiments, activating the meeting link automatically causes the client device to transmit a request to the server (e.g., communication session server 125) to join the communication session.

The client device joins the established communication session at operation 540. The request to join the communication session is either granted automatically or granted based on approval by a host or other user. Thus, authorization to join a communication session is based at least in part on the user's knowledge of the meeting link, and can additionally be based on approval by another user. The client device, once authorized, joins the communication session to exchange video and/or audio data with other participants, thus enabling a virtual meeting to take place. In some embodiments, the audio and/or video data is presented by the client device using a WebRTC protocol. Thus, a remote participant can join a communication session without having to register a user account, provide an email address or other identifier, install additional software, or perform any other additional actions.

Figure 6:
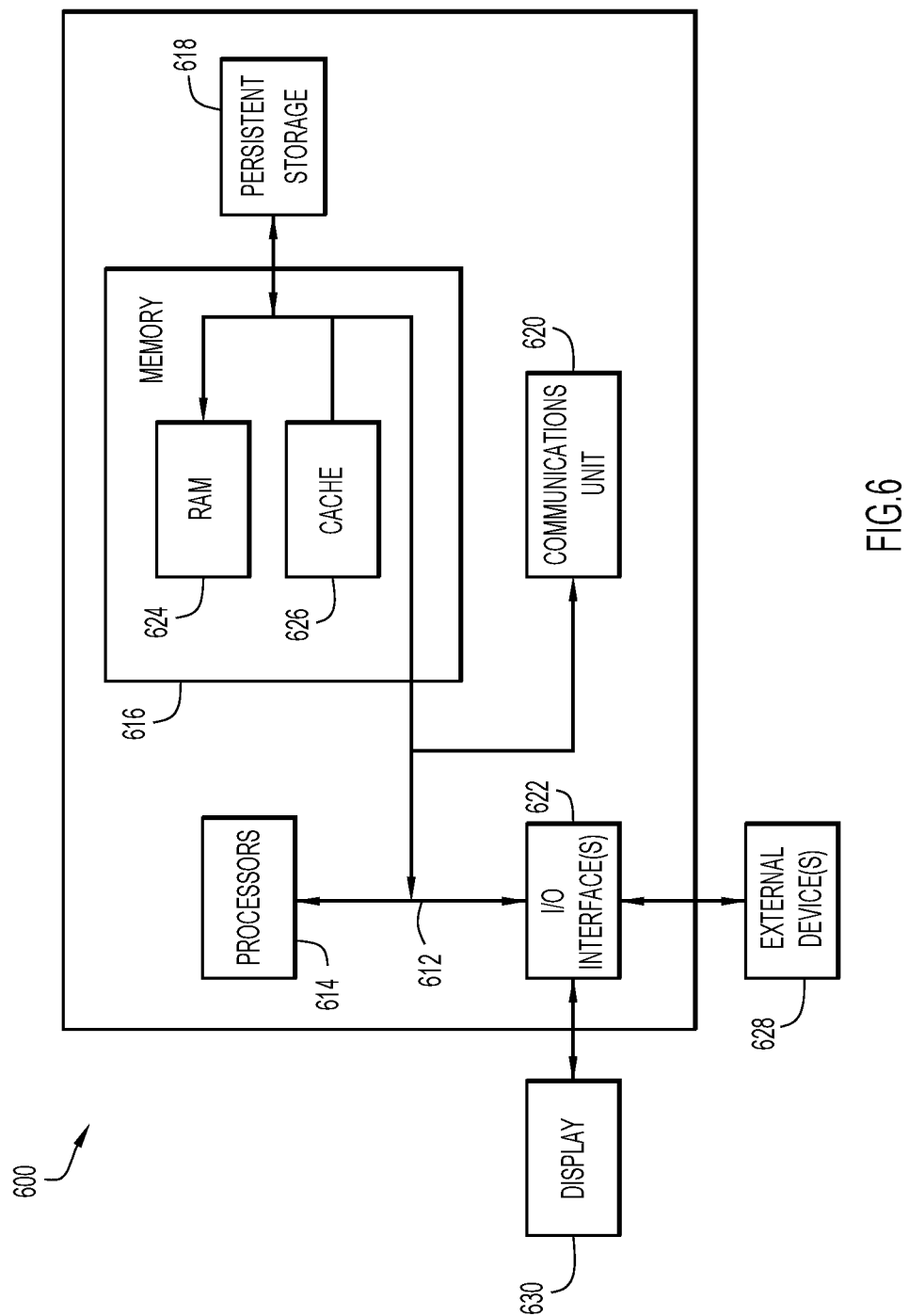
FIG. 6 is a block diagram depicting a computing device in accordance with an example embodiment.

FIG. 6 is a block diagram depicting components of a computing device 600 suitable for executing the methods disclosed herein. Computing device 600 may be representative of a computing device suitable for an implementation of some or all of the functions of endpoint device 105, client devices 115A-115N, and/or communication session server 125 in accordance with example embodiments. It should be appreciated that FIG. 6 provides only an illustration of one embodiment and does not imply any limitations with regard to the environments in which different embodiments may be implemented. Many modifications to the depicted environment may be made.

As depicted, the computing device 600 includes communications fabric 612, which provides communications between computer processor(s) 614, memory 616, persistent storage 618, communications unit 620, and input/output (I/O) interface(s) 622. Communications fabric 612 can be implemented with any architecture designed for passing data and/or control information between processors (such as microprocessors, communications and network processors, etc.), system memory, peripheral devices, and any other hardware components within a system. For example, communications fabric 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as, for example, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

Data relating to conferencing (e.g., video and/or audio data captured from and/or presented to users, associations between endpoint devices, meeting links, and/or meeting room identities, any associated metadata, etc.) may be stored within any conventional or other data structures (e.g., files, arrays, lists, stacks, queues, records, etc.) and may be stored in any desired storage unit (e.g., database, data or other repositories, queue, etc.). The data transmitted between endpoint device 105, client devices 115A-115N, and/or communication session server 125 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to conferencing (e.g., video and/or audio data captured from and/or presented to users, associations between endpoint devices, meeting links, and/or meeting room identities, any associated metadata, etc.) may include any information provided to, or generated by, endpoint device 105, client devices 115A-115N, and/or communication session server 125. Data relating to conferencing may include any desired format and arrangement, and may include any quantity of any types of fields of any size to store any desired data. The data relating to conferencing may include any data collected about entities by any collection mechanism, any combination of collected information, and any information derived from analyzing collected information.

The present embodiments may employ any number of any type of user interface (e.g., Graphical User Interface (GUI), command-line, prompt, etc.) for obtaining or providing information (e.g., data relating to conferencing), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing device-based ad hoc conferencing.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., communications software, server software, host module 113, client module 123, meeting room management module 135, communication session module 140, etc.). These systems may include any types of monitors and input devices (e.g., keyboard, mouse, voice recognition, etc.) to enter and/or view information.

It is to be understood that the software (e.g., communications software, server software, host module 113, client module 123, meeting room management module 135, communication session module 140, etc.) of the present embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present embodiments (e.g., communications software, server software, host module 113, client module 123, meeting room management module 135, communication session module 140, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to conferencing). The database system may be implemented by any number of any conventional or other databases, data stores or storage structures (e.g., files, databases, data structures, data or other repositories, etc.) to store information (e.g., data relating to conferencing). The database system may be included within or coupled to the server and/or client systems. The database systems and/or storage structures may be remote from or local to the computer or other processing systems, and may store any desired data (e.g., data relating to conferencing).

The present embodiments may employ any number of any type of user interface (e.g., Graphical User Interface (GUI), command-line, prompt, etc.) for obtaining or providing information (e.g., data relating to conferencing), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present embodiments are not limited to the specific tasks or algorithms described above, but may be utilized for any number of applications in the relevant fields, including, but not limited to, device-based ad hoc communication sessions.

The terminology used herein is for the purpose of describing particular embodiments only and is not intended to be limiting of the described embodiments. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the described embodiments. The embodiments were chosen and described in order to enable others of ordinary skill in the art to understand the various embodiments with various modifications as are suited to the particular use contemplated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a method is provided comprising: storing information associating a particular meeting link with an endpoint device, receiving a first request to initiate a communication session from the endpoint device, wherein the first request is generated by a local participant interacting with the endpoint device, receiving a second request to join the communication session from a remote device, wherein the second request is transmitted in response to a remote participant inputting, on the remote device, the particular meeting link, and establishing the communication session between the endpoint device and the remote device based on receiving the first request and receiving the second request.

In one form, an apparatus is provided comprising: one or more computer processors, one or more computer readable storage media, program instructions stored on the one or more computer readable storage media for execution by at least one of the one or more computer processors, the program instructions comprising instructions to: store information associating a particular meeting link with an endpoint device, receive a first request to initiate a communication session from the endpoint device, wherein the first request is generated by a local participant interacting with the endpoint device, receive a second request to join the communication session from a remote device, wherein the second request is transmitted in response to a remote participant inputting, on the remote device, the particular meeting link, and establish the communication session between the endpoint device and the remote device based on receiving the first request and receiving the second request.

In another form, establishing the communication session further includes receiving from the endpoint device an indication of approval by the local participant that the remote participant be permitted into the communication session.

In another form, the method further comprises locking the communication session to deny additional requests from one or more other participants at one or more other devices to join the communication session. In a further form, locking is performed in response to receiving a lock command from the endpoint device.

In another form, receiving the second request is based on the remote participant entering the particular meeting link into a web browser application at the remote device, and wherein the communication session is implemented using a Web Real-Time Communication (WebRTC) protocol.

In another form, the particular meeting link comprises a Uniform Resource Locator (URL), and wherein a first portion of the URL includes a name of a physical space with which the endpoint device is associated. In a further form, the particular meeting link is one of a plurality of meeting links each associated with a different physical space of a plurality of physical spaces, and wherein a second portion of the URL of each meeting link corresponds to an entity that is associated with the plurality of physical spaces.

In another form, the communication session comprises a video conference.

In one form, a method is provided comprising: presenting on a user interface screen of an endpoint device, a first user interface element configured to enable a local participant at the endpoint device to initiate a communication session using a particular meeting link associated with the endpoint device, and transmitting to a server, by the endpoint device, a request to initiate the communication session, wherein the request is generated by the local participant interacting with the first user interface element on the endpoint device, wherein the communication session is established by the server between the endpoint device and a remote device in response to a remote participant inputting, at the remote device, the particular meeting link.

In another form, the method further comprises: presenting on the user interface screen of the endpoint device a second user interface element configured to enable the local participant to lock the communication session, and in response to the local participant interacting with the second user interface element, transmitting from the endpoint device to the server a lock command configured to cause the server to prevent other participants from joining the communication session.

In another form, the communication session is further established between the endpoint device and the remote device in response to the local participant providing, to the endpoint device, approval of a request by the remote device to join the communication session.

In another form, the particular meeting link comprises a Uniform Resource Locator (URL), and wherein a first portion of the URL includes a name of a physical space with which the endpoint device is associated. In a further form, the particular meeting link is one of a plurality of meeting links each associated with a different physical space of a plurality of physical spaces, and wherein a second portion of the URL of each meeting link corresponds to an entity that is associated with the plurality of physical spaces.

In another form, the communication session comprises a video conference.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
storing information associating a particular meeting link with an endpoint device, wherein the particular meeting link is one of a plurality of meeting links each associated with a different endpoint device of a plurality of endpoint devices, wherein each meeting link of the plurality of meeting links comprises a first portion that includes a name of a physical space of a plurality of physical spaces with which each endpoint device is associated, and wherein the plurality of meeting links correspond to the plurality of physical spaces;
receiving a first request to initiate a communication session from the endpoint device associated with the particular meeting link, wherein the first request is generated by a local participant physically interacting with the endpoint device;
receiving a second request to join the communication session from a remote device, wherein the second request is transmitted in response to a remote participant inputting, on the remote device, the particular meeting link, wherein the first portion of the particular meeting link is specifically associated with the endpoint device with which the local participant is physically interacting;
establishing the communication session between the endpoint device and the remote device based on receiving the first request and receiving the second request;
presenting on a user interface screen of the endpoint device a user interface element configured to enable the local participant to lock the communication session; and in response to the local participant interacting with the user interface element, transmitting from the endpoint device to a server a lock command configured to cause the server to prevent other participants from joining the communication session.

2. The method of claim 1, wherein establishing further includes receiving from the endpoint device an indication of approval by the local participant that the remote participant be permitted into the communication session.

3. The method of claim 1, further comprising locking the communication session to deny additional requests from one or more other participants at one or more other devices to join the communication session.

4. The method of claim 3, wherein locking is performed in response to receiving a lock command from the endpoint device.

5. The method of claim 1, wherein receiving the second request is based on the remote participant entering the particular meeting link into a web browser application at the remote device, and wherein the communication session is implemented using a Web Real-Time Communication (WebRTC) protocol.

6. The method of claim 1, wherein the particular meeting link comprises a Uniform Resource Locator (URL).

7. The method of claim 1, wherein a second portion of each meeting link corresponds to an entity that is associated with the plurality of physical spaces.

8. The method of claim 1, wherein the communication session comprises a video conference.

9. A method comprising:
presenting on a user interface screen of an endpoint device, a first user interface element configured to enable a local participant at the endpoint device to initiate a communication session using a particular meeting link associated with the endpoint device, wherein the particular meeting link is one of a plurality of meeting links each associated with a different endpoint device of a plurality of endpoint devices, wherein each meeting link of the plurality of meeting links comprises a first portion that includes a name of a physical space of a plurality of physical spaces with which each endpoint device is associated, and wherein the plurality of meeting links correspond to the plurality of physical spaces;

transmitting to a server, by the endpoint device associated with the particular meeting link, a request to initiate the communication session, wherein the request is generated by the local participant physically interacting with the first user interface element on the endpoint device;

wherein the communication session is established by the server between the endpoint device and a remote device in response to a remote participant inputting, at the remote device, the particular meeting link, wherein the first portion of the particular meeting link is specifically associated with the endpoint device with which the local participant is physically interacting;

presenting on the user interface screen of the endpoint device a second user interface element configured to enable the local participant to lock the communication session; and in response to the local participant interacting with the second user interface element, transmitting from the endpoint device to the server a lock command configured to cause the server to prevent other participants from joining the communication session.

10. The method of claim 9, wherein the communication session is further established between the endpoint device and the remote device in response to the local participant providing, to the endpoint device, approval of a request by the remote device to join the communication session.

11. The method of claim 9, wherein the particular meeting link comprises a Uniform Resource Locator (URL).

12. The method of claim 9, wherein a second portion of each meeting link corresponds to an entity that is associated with the plurality of physical spaces.

13. The method of claim 9, wherein the communication session comprises a video conference.

14. An apparatus comprising:
one or more computer processors;
one or more computer readable storage media;
program instructions stored on the one or more computer readable storage media for execution by at least one of the one or more computer processors, the program instructions comprising instructions to:
store information associating a particular meeting link with an endpoint device, wherein the particular meeting link is one of a plurality of meeting links each associated with a different endpoint device of a plurality of endpoint devices, wherein each meeting link of the plurality of meeting links comprises a first portion that includes a name of a physical space of a plurality of physical spaces with which each endpoint device is associated, and wherein the plurality of meeting links correspond to the plurality of physical spaces;

receive a first request to initiate a communication session from the endpoint device associated with the particular meeting link, wherein the first request is generated by a local participant physically interacting with the endpoint device;

receive a second request to join the communication session from a remote device, wherein the second request is transmitted in response to a remote participant inputting, on the remote device, the particular meeting link, wherein the first portion of the particular meeting link is specifically associated with the endpoint device with which the local participant is physically interacting;

establish the communication session between the endpoint device and the remote device based on receiving the first request and receiving the second request;

present on a user interface screen of the endpoint device a user interface element configured to enable the local participant to lock the communication session; and in response to the local participant interacting with the user interface element, transmit from the endpoint device to a server a lock command configured to cause the server to prevent other participants from joining the communication session.

15. The apparatus of claim 14, wherein the program instructions that establish the communication session further include program instructions to receive from the endpoint device an indication of approval by the local participant that the remote participant be permitted into the communication session.

16. The apparatus of claim 14, wherein the program instructions further comprise instructions to:
lock the communication session to deny additional requests from one or more other participants at one or more other devices to join the communication session.

17. The apparatus of claim 16, wherein the program instructions to lock the communication session are responsive to receiving a lock command from the endpoint device.

18. The apparatus of claim 14, wherein the second request is based on the remote participant entering the particular meeting link into a web browser application at the remote device, and wherein the communication session is implemented using a Web Real-Time Communication (WebRTC) protocol.

19. The apparatus of claim 14, wherein the particular meeting link comprises a Uniform Resource Locator (URL).

20. The apparatus of claim 14, wherein a second portion of each meeting link corresponds to an entity that is associated with the plurality of physical spaces.

* * * * *